US011830371B2

(12) United States Patent
Sathiyanathan et al.

(10) Patent No.: US 11,830,371 B2
(45) Date of Patent: Nov. 28, 2023

(54) TRAFFIC MANAGEMENT FOR UNMANNED AIRCRAFT

(71) Applicant: International Business Machines Corporation, Armonk, NY (US)

(72) Inventors: Naveen Mathew Nathan Sathiyanathan, Chennai (IN); Linsong Chu, White Plains, NY (US); Raghu Kiran Ganti, White Plains, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 17/023,536

(22) Filed: Sep. 17, 2020

(65) Prior Publication Data
US 2022/0084418 A1  Mar. 17, 2022

(51) Int. Cl.
G08G 5/00 (2006.01)
G06N 20/00 (2019.01)

(52) U.S. Cl.
CPC .......... G08G 5/0043 (2013.01); G06N 20/00 (2019.01); G08G 5/0013 (2013.01); G08G 5/0069 (2013.01)

(58) Field of Classification Search
CPC .. G08G 5/0043; G08G 5/0013; G08G 5/0069; G08G 5/0026; G08G 5/0082;
(Continued)

(56) References Cited

U.S. PATENT DOCUMENTS 10,134,291 B2 * 11/2018 Chan ................. G08G 5/0082
10,163,357 B2   12/2018 Venkatraman et al.
(Continued)

FOREIGN PATENT DOCUMENTS

KR   20170080354 A   7/2017
KR     101803005 B1  11/2017
KR     101999126 B1   9/2019

OTHER PUBLICATIONS

IPCOM000253225D; "Method and System for Providing Conflict-Free and Stopping-Free Traffic Management of Drones using On-Board Logic and Peer-to-Peer Communication." https://ip.com/IPCOM/000253225 (Published Mar. 14, 2018), 6 pages.
(Continued)

Primary Examiner — Jelani A Smith
Assistant Examiner — Davin Seol
(74) Attorney, Agent, or Firm — CANTOR COLBURN LLP; Michael A. Petrocelli

(57) ABSTRACT

Aspects of the invention include receiving, by a processor, airspace data associated with a predefined airspace, obtaining roadway data associated with the predefined airspace, determining a set of air travel channels within the predefined airspace based on the roadway data, defining a set of travel lanes within the set of air travel channels, wherein each travel lane in the set of travel lanes comprises an altitude range, receiving unmanned aircraft (UA) data associated with a set of UAs within the predefined airspace, wherein the UA data comprises one or more flight paths for each UA in the set of UAs, and assigning each UA in the set of UAs to a travel lane in the set of travel lanes based on the one or more flight paths.

19 Claims, 5 Drawing Sheets

(58) Field of Classification Search
CPC ........ G06N 20/00; G06N 3/006; G06N 7/005; G06Q 10/06; G06Q 50/30
See application file for complete search history.

(56) References Cited

U.S. PATENT DOCUMENTS

| | | |
|---|---|---|
| 10,571,932 B2 | 2/2020 | Debitetto et al. |
| 2018/0293898 A1* | 10/2018 | Redmann ............. G08G 5/0034 |
| 2019/0027050 A1 | 1/2019 | Soma et al. |
| 2021/0125507 A1* | 4/2021 | Haider ................ G08G 5/0069 |
| 2021/0287559 A1* | 9/2021 | Jeong ................... G05D 1/0044 |
| 2021/0403159 A1* | 12/2021 | Dey ....................... G05D 1/104 |

OTHER PUBLICATIONS

Moteir et al., "Urban Intelligent Navigator for Drone Using Convolutional Neural Network (CNN)," International Conference on Smart Applications, Communications and Networking (SmartNets), 2019, 4 pages.

\* cited by examiner

TRAFFIC MANAGEMENT FOR UNMANNED AIRCRAFT

BACKGROUND

The present invention generally relates to computer systems that control unmanned aircraft, and more specifically relates to a computer system configured to implement traffic management for unmanned aircraft system.

Air traffic control (ATC) is a service provided by ground-based air traffic controllers who direct aircraft on the ground and through controlled airspace and can provide advisory services to aircraft in non-controlled airspace. The primary purpose of ATC worldwide is to prevent collisions; organize and expedite the flow of air traffic; and provide information and other support for pilots.

An unmanned aircraft (UA) is an aircraft without a human pilot on board. UAs are a component of a UA system, which can include a UA, a ground-based controller, and a system of communications between the two. UA system utilization has increased over the years and are a promising technology for various applications including package delivery, video surveillance, and the like. With the increase in utilization of UAs, a system is needed to control operation of these UAs within residential and commercial areas.

SUMMARY

Embodiments of the present invention are directed to a method for an air traffic management system for UAs in a predefined airspace. A non-limiting example computer-implemented method includes receiving, by a processor, airspace data associated with a predefined airspace, obtaining roadway data associated with the predefined airspace, determining a set of air travel channels within the predefined airspace based on the roadway data, defining a set of travel lanes within the set of air travel channels, wherein each travel lane in the set of travel lanes comprises an altitude range, receiving unmanned aircraft (UA) data associated with a set of UAs within the predefined airspace, wherein the UA data comprises one or more flight paths for each UA in the set of UAs, and assigning each UA in the set of UAs to a travel lane in the set of travel lanes based on the one or more flight paths.

Embodiments of the present invention are directed to a system for an air traffic management system for UAs in a predefined airspace. A non-limiting example system includes a processor coupled to a memory, the processor configured to perform receiving, by a processor, airspace data associated with a predefined airspace, obtaining roadway data associated with the predefined airspace, determining a set of air travel channels within the predefined airspace based on the roadway data, defining a set of travel lanes within the set of air travel channels, wherein each travel lane in the set of travel lanes comprises an altitude range, receiving unmanned aircraft (UA) data associated with a set of UAs within the predefined airspace, wherein the UA data comprises one or more flight paths for each UA in the set of UAs, and assigning each UA in the set of UAs to a travel lane in the set of travel lanes based on the one or more flight paths.

Embodiments of the present invention are directed to a computer program product for an air traffic management system for UAs in a predefined airspace, the computer program product including a computer readable storage medium having program instructions embodied therewith. The program instructions are executable by a processor to cause the processor to perform a method. A non-limiting example of the method includes receiving, by a processor, airspace data associated with a predefined airspace, obtaining roadway data associated with the predefined airspace, determining a set of air travel channels within the predefined airspace based on the roadway data, defining a set of travel lanes within the set of air travel channels, wherein each travel lane in the set of travel lanes comprises an altitude range, receiving unmanned aircraft (UA) data associated with a set of UAs within the predefined airspace, wherein the UA data comprises one or more flight paths for each UA in the set of UAs, and assigning each UA in the set of UAs to a travel lane in the set of travel lanes based on the one or more flight paths.

In accordance with aspects of the invention, the technical effects and benefits include systems for managing unmanned vehicles and aircraft in a defined airspace or area. Reinforcement learning is deployed to optimize the state of the system which includes travel lanes and UAs operating within the travel lanes. As UAs are being routed through the airspace, the reinforcement learning allows for exploratory and/or greedy tasks to be enacted to further optimize. Based on changes to the state of the system, rewards are calculated such that the reinforcement learning model can build upon prior system states and changes based on actions.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide for traffic management of unmanned aircraft (UA) or "drones" within a defined airspace utilizing machine learning. UAs have increased in utilization for both commercial and recreational purposes for a variety of applications ranging from package delivery to video surveillance. As more and more commercial entities being using UAs, there exists a need for air traffic management especially while operating in commercial and residential locations. UAs can, typically, operate autonomously where a flight path from a source to a destination is determined and mapped out within an airspace. Without an air traffic management system to regulate how this flight path is managed in high traffic areas with other UAs, there exists a risk for collisions and damage to property.

One or more embodiments of the present invention address one or more of the above-described technological shortcomings of the prior art by providing for managing UA traffic in a pre-defined airspace using existing roadway infrastructure and machine learning for managing UA operation within the pre-defined airspace. The air traffic management can provide for safety of operation as well as optimization of UA throughput in the airspace thus minimizing the amount of time for a UA to complete its flight path. Embodiments of the invention described herein include defining an airspace that translates a two-dimensional roadway network that already exists in most areas into a three-dimensional (3D) airspace. The lanes on the roadways are used as a mapping for vertical travel channels above the roadway lanes that can be utilized for operation of the UAs in the airspace. In a sense, the UAs are essentially following along a roadway to get to a destination and the vertical channels can be defined for operation of the UAs. The vertical channel can be subdivided into vertical travel lanes for UAs operating the airspace. The assignment, by the air traffic management system, of a UA to a vertical travel lane can be based on a variety of factors including, but not limited to, distance from a UA's current position to its destination, type of UA, available power for the UA, a top speed of the UA, the application (commercial or recreation) for the UA, and the like. Each vertical lane can be defined within an altitude range and have an associated speed range for the UAs to operate. For example, a vertical lane at a higher altitude can be utilized by UAs that are far from their destination and thus not stopping within a certain distance. These higher altitude lanes can have a higher speed. As the UA gets closer to its destination, the UA can be required to change to a lower altitude lane and a lower speed limit or speed range. The lowest altitude vertical lane can be utilized for drones that are approaching their destination and would need to descend to delivery heights or exit from the airspace.

Figure 1:
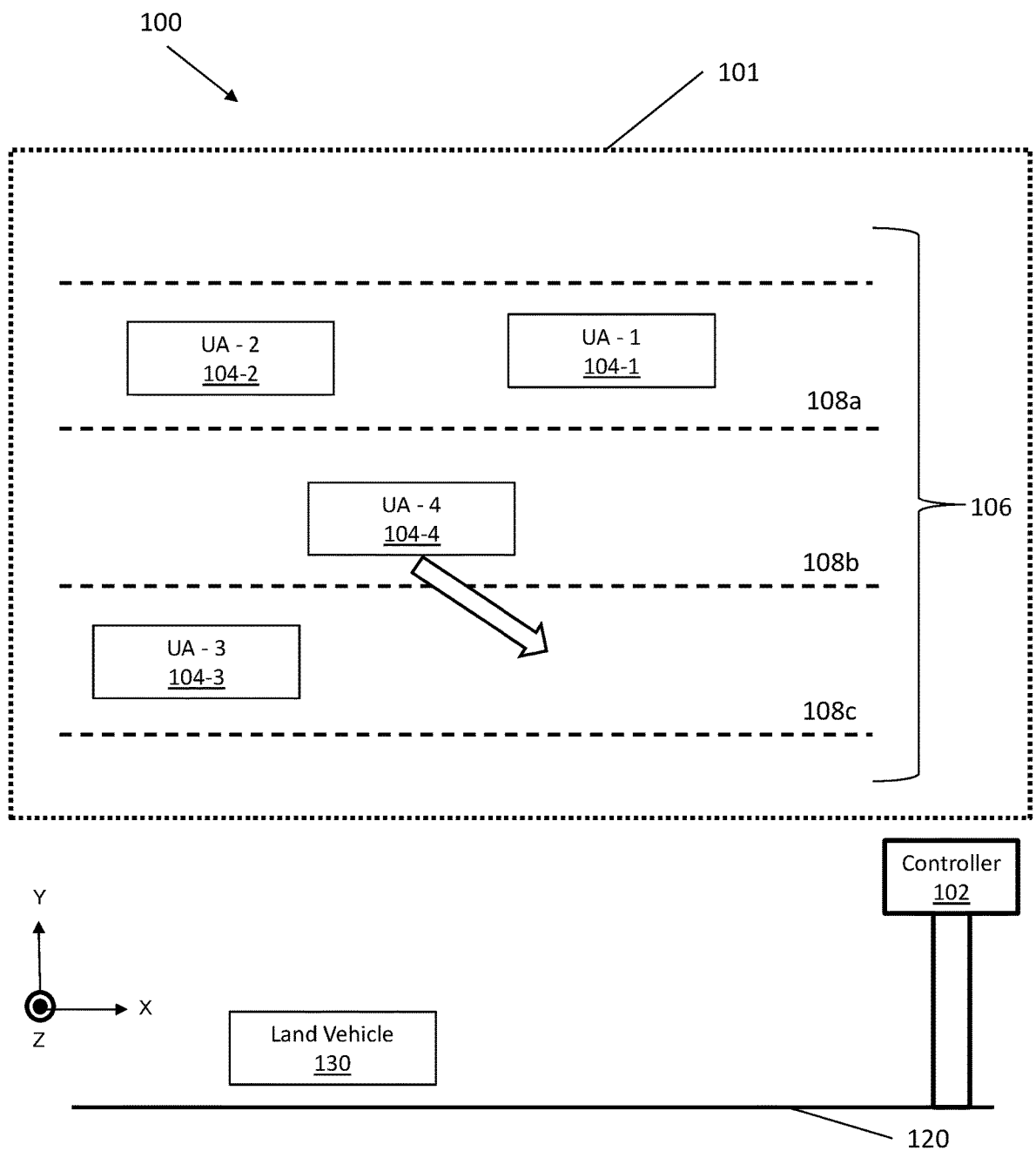
FIG. 1 illustrates a block diagram of components of an air traffic management system for UAs in a predefined airspace in accordance with one or more embodiments of the present invention.

Turning now to FIG. 1, an air traffic management system 100 for UAs in a predefined airspace is generally shown in accordance with one or more embodiments of the present invention. In one or more embodiments of the invention, the air traffic management system 100 includes a defined airspace 101 with a vertical channel 106 subdivided into multiple travel lanes 108a, 108b, 108c. While only three travel lanes are shown in the exemplary figure, fewer or more than three travel lanes can be defined within a vertical channel in one or more embodiments. The system 100 includes a controller 102 for defining the airspace 101 and the multiple travel lanes 108a, 108b, 108c. In one or more embodiments of the present invention, the controller 102 defines the airspace 101, the travel channel 106, and travel lanes 108a, 108b, 108c by obtaining roadway data associated with a road network 120 that is being traversed by land vehicles 130 such as cars and trucks. Most road networks 120 are already defined and can be converted from a two-dimensional network of travel lanes to a three-dimensional network of travel channels that UAs can travel through when going from a source to a destination location. The travel lanes 108a, 108b, 108c can essentially mimic the horizontal lanes on the roadway 120 below but instead of being spread horizontally, the travel lanes 108a, 108b, 108c in the airspace 101 are defined vertically.

In addition, each travel lane 108a, 108b, 108c can have a defined altitude range and speed limit or speed range. For example, the highest travel lane 108a can be set at an altitude between 20-30 meters from the ground and UAs assigned to this travel lane 108a would need to operate within that altitude range and operate at a travel velocity within the defined velocity ranges (e.g., between 30-40 kilometers per hour (kph)). Other rules can be defined such as minimum distance between UAs while in the travel lanes 108a, 108b, 108c. In the exemplary illustration, there are a total of four UAs (104-1, 104-2, 104-3, 104-4) operating within the travel lanes 108a, 108b, 108c.

In one or more embodiments of the present invention, the controller 102 can manage the operation of the UAs (104-1, 104-2, 104-3, 104-4) within the airspace 101 by assigning each UA to a specific travel lane for a set period of time or for a set distance to operate in the lane. In addition, the controller 102 can assign a specific route to take to the destination for each UA. The assignment of the UA can be based on, for example, a distance from the UAs current location to their destination location. For example, if a UA is travelling through the airspace and their destination is a great distance, the controller 102 can assign this UA to the top travel lane 108a, for example, because the UA is not going to be stopping sooner than other UAs that have destinations that are closer. Additionally, the top travel lane 108a can have the highest speed range for the UAs so that they can travel through the airspace 101 faster. As the UA gets closer to the destination, the UA can be assigned, by the controller 102, to lower travel lanes. In one or more embodiments of the present invention, the controller 102 can define the lowest travel lane 108c as an exit lane having the lowest speed range. Within this lowest travel lane 108c, UAs can descend to heights necessary for completing their task at their destination. For example, the UA can descend to deliver a package or to land at a specific location from this lowest travel lane 108c.

In one or more embodiments of the invention, the controller 102 can be located within the airspace 101 or located remote from the airspace 101. Utilizing the roadway as the map for the three-dimensional airspace 101 with vertical travel lanes 108a, 108b, 108c, several edge computing devices can be installed within existing structures on the roadway 120. For example, transceivers can be housed within traffic lights, road lighting, and other permanent structures associated with the roadway 130. The transceivers (edge devices) can be in wireless or wired communication with each other and the controller 102. The edge devices located at various locations on the roadway network can receive periodic broadcasts from the UAs in the airspace. These broadcasts can include data about the UAs flight path, changes to destinations, batter power remaining, and the like. This data can be transmitted to the controller 102 for analysis. Based on this analysis, the controller 102 can take certain actions within the airspace. Edge artificial intelligence (AI) can be utilized at edge devices, for example, with a pre-trained scoring model (e.g. through deep reinforcement learning) enabled on edge devices, edge devices can make optimized guidance on UAs in real time, by using the combined information from both agent (individual UA's location, speed, azimuth, destination, etc.) and environment (congestion of roadways, time of the day, etc.). In terms of placing locations, edge devices placed on roadways are typically wired while edge devices on UAs are battery-powered, thus heavy lifting works (e.g. running edge AI model) are typically done in edge devices that are placed on roadways. This way, UAs' edge devices can mainly be used to communicate and react which avoid draining battery quickly.

In one or more embodiments of the invention, the controller 102 can utilize techniques for optimizing a set of UAs within the airspace 101 such that the source to destination travel time within the airspace 101 is minimized based on the assignment of UAs to certain travel lanes 108a, 108b, 108c. In a sense, the airspace 101 acts as a system that the controller 102 is attempting to optimize. At any time period, a system state can be determined for the airspace 101. The system state of the airspace 101 can include the current locations of all UAs, the speed of operation of each UA, the assigned travel lane for each UA, and the like. The controller 102 can utilize a machine learning model for optimizing the system state for the airspace 101 as needed for either further optimization or based on any changes in the system (e.g., airspace 101). For example, changes in the system can include changes in weather, air pressure, new UAs entering the airspace, and the like. The machine learning model can be a reinforcement learning model utilized by the controller 102 for controlling the airspace 101.

Reinforcement learning is a machine learning technique that learns from trial and error by getting a reward from interacting with an environment(s). Typically, the goal in reinforcement learning is to find a balance between exploration (of uncharted territory) and exploitation (of current knowledge). In reinforcement learning, an agent (e.g., a controller) interacts with the system environment. After taking an action a, the system environment provides a description of its current state s (e.g., a vector covering selected parameters) and a reward r is provided. The reward r can be a quantification of state changes occurring as a result of the action a (e.g., the evaluation of a performance metric.) The agent can then utilize a, s, and r to update its state-action values (i.e., a function Q(s, a) that estimates the reward obtained by taking action a on state s). The agent then decides on a next action a' by either choosing an exploratory random action or a greedy action according to Q(s, a) that optimizes the expected reward. Depending on the implementation, the reward can be optimized on a short-term or a long-term scale. Then, the environment provides state s' and reward r' and the next cycle starts.

In one or more embodiments of the present invention, the controller 102 using the reinforcement learning model described above can continuously update the state of the airspace 101 by taking certain actions (e.g., moving UAs between lanes, adjusting speed limits or ranges, adding lanes, etc.) and determining the state of the airspace after the action is taken. Based on this state, a reward is calculated, and the machine learning model is updated based on this reward calculated from a change to the state of the airspace 101. For example, as UA-4 104-4 is getting closer to its destination, the controller 102 can enact an action by assigning UA-4 104-4 to travel lane 108c. The system state changes based on this assignment and a reward is calculated for the machine learning model.

In one or more embodiments of the invention, changes to the system can include the entry and exit of UAs into the airspace 101. Any new UAs to the airspace 101 can communicate with the controller 102 and present a flight path and other data associated with the UA. This other data can include, for example, operational information about the UA such as top speed, nature of the UAs task, battery power remaining, and the like. The controller 102 can analyze this data to assign the new UA to a travel lane within the airspace 101. The assignment of the new UA includes the notification to the other UAs operating within to allow for the entry of the new UA into the airspace 101 and the assigned travel lane. As described above, the assignment of the new UA can be an action that can change the state of the system such that a reward is calculated. Additionally, any UAs that exit the airspace 101 can cause the state of the airspace 101 to change and thus the controller 102 determines actions to take and rewards calculated. The status of the target UA, together with the full environment (roadway status and all other UAs' status) is the input for the RL model, then model will output scores for all possible actions, finally the action that has highest score is used as guidance. The calculated rewards can be based on short or long term goals for the airspace 101. Some goals can include having a high throughput of UAs through the airspace or having efficient travel routes to save on battery power of the UAs.

In one or more embodiment of the invention, the UAs will need to change travel lanes within the airspace 101. To achieve this ability to change lanes, the controller 102 can define exchange locations for the travel lanes 108a, 108b, 108c. At these exchange locations, the UAs can either increase or decrease their altitude and thus change to a new travel lane within the airspace 101. In one or more embodiments of the invention, the controller 102 can define the exchange locations at intersections within the roadway 120 taken from the roadway data. As the vertical channels 106 are defined over the roadway 120, at each roadway intersection, the vertical channels 106 can have similar airspace exchange that are the only locations that the UAs can adjust their altitude to change travel lanes. In addition, each travel lane can have more or fewer intersection locations than the other travel lanes. For example, the highest travel lane 108a having the greatest speed range for the UAs might have fewer intersections that are spaced further away due to the speed of operation within this travel lane 108a. The lowest travel lane 108c can have more intersections than travel lane 108a and these intersections can be spaced closer together similar to how certain roads have more intersections with lower speed limits and other roadways (such as a highway) has fewer interchanges and a higher speed limit.

In one or more embodiments of the invention, the controller 102 or any hardware in system 100 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 2:
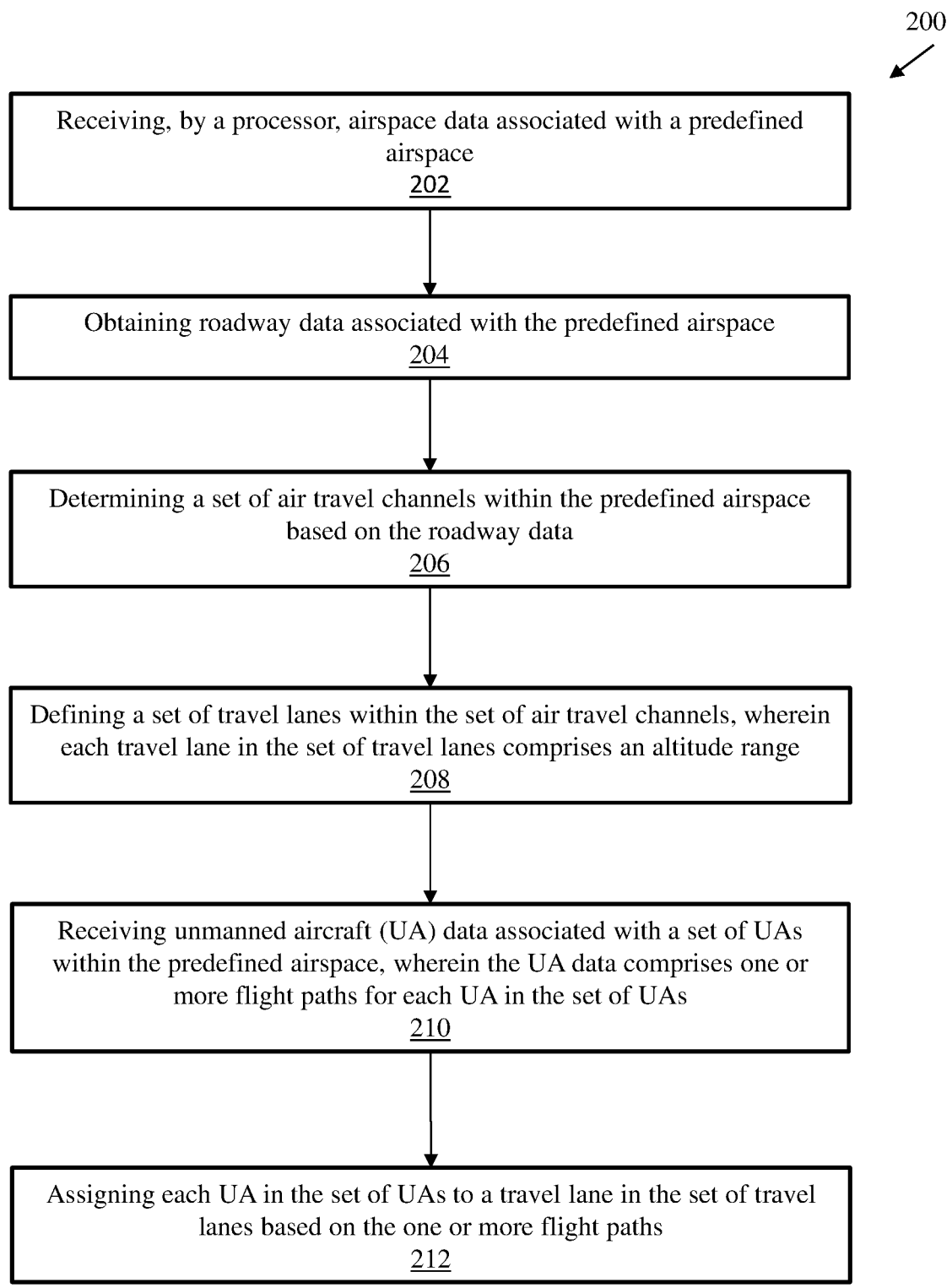
FIG. 2 depicts a flow diagram of a method for air traffic management according to one or more embodiments of the invention.

FIG. 2 depicts a flow diagram of a method 200 for air traffic management according to one or more embodiments of the invention. At least a portion of the method 200 can be executed, for example, by the controller 102 shown in FIG. 1. The method 200 includes receiving, by a processor (e.g., the controller 102), airspace data associated with a predefined airspace, as shown in block 202. The method 200, at block 204, includes obtaining roadway data associated with the predefined airspace. The roadway data is typically available for most road networks. Each road network can traverse large areas that are sparsely populated as well as densely populated city roadway networks. Next, the method 200 includes determining a set of air travel channels within the predefined airspace based on the roadway data, as shown in block 206. The air travel channels can mimic the roadways below the airspace. At block 208, the method 208 includes defining a set of travel lanes within the set of air travel channels, wherein each travel lane in the set of travel lanes comprises an altitude range. The altitude range can be an operating range for the UAs to safely operate to avoid potentials for collision. The lanes can also include rules for how close the UAs can operate next to each other as well as speed limits and other movement restrictions within the travel lanes. The method 200, at block 210, includes receiving unmanned aircraft (UA) data associated with a set of UAs within the predefined airspace, wherein the UA data comprises one or more flight paths for each UA in the set of UAs. The flight paths include a source and destination and the air traffic management can define a specific route within the set of travel lanes for the UAs to take. And at block 212, the method 200 includes assigning each UA in the set of UAs to a travel lane in the set of travel lanes based on the one or more flight paths.

Additional processes may also be included. It should be understood that the processes depicted in FIG. 2 represent illustrations, and that other processes may be added, or existing processes may be removed, modified, or rearranged without departing from the scope and spirit of the present invention.

In accordance with aspects of the invention, the technical effects and benefits include systems for managing unmanned vehicles and aircraft in a defined airspace or area. Reinforcement learning is deployed to optimize the state of the system which includes travel lanes and UAs operating within the travel lanes. As UAs are being routed through the airspace, the reinforcement learning allows for exploratory and/or greedy tasks to be enacted to further optimize. Based on changes to the state of the system, rewards are calculated such that the reinforcement learning model can build upon prior system states and changes based on actions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
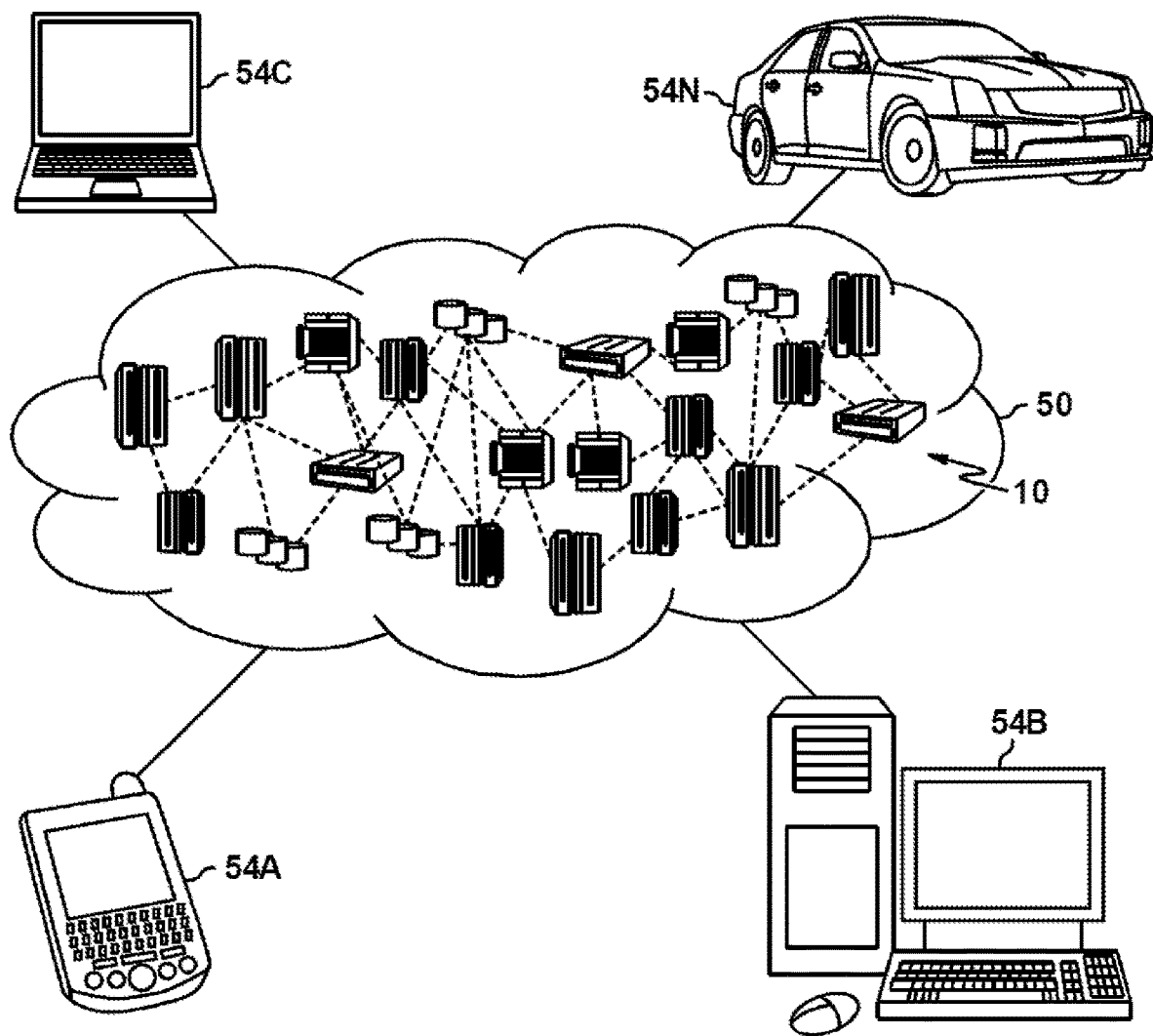
FIG. 3 depicts a cloud computing environment according to one or more embodiments of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
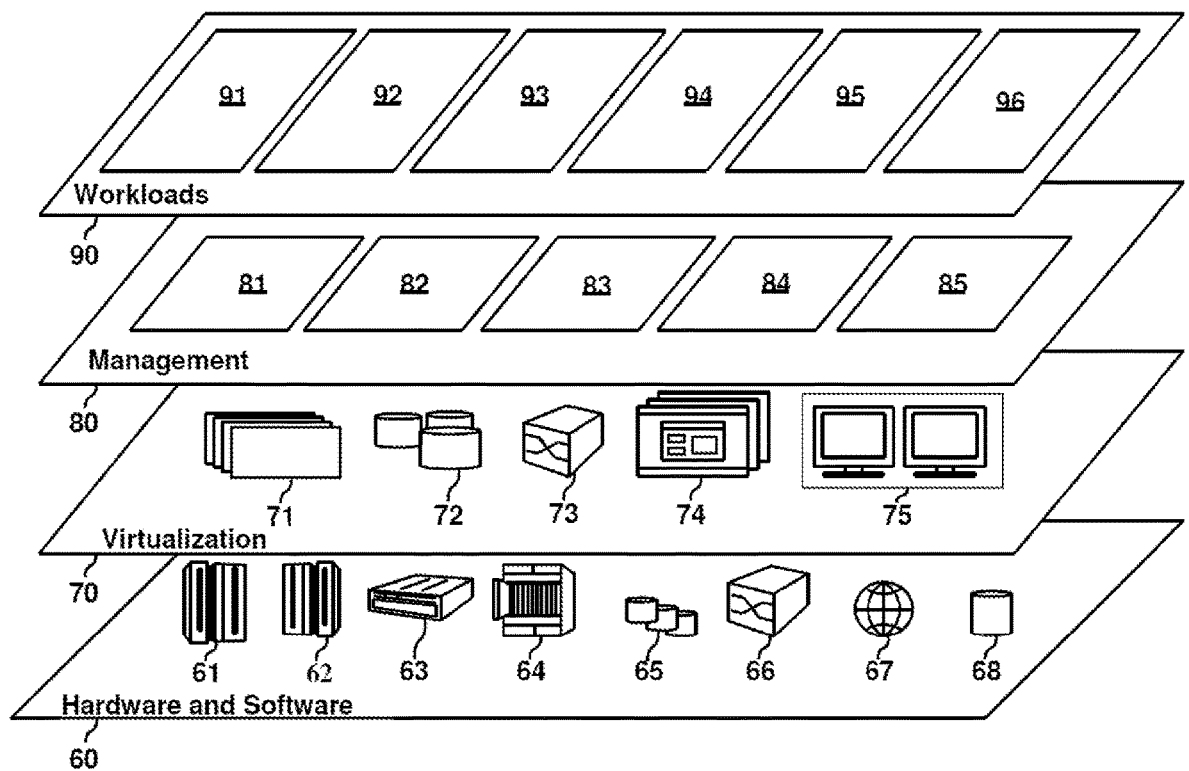
FIG. 4 depicts abstraction model layers according to one or more embodiments of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and air traffic management of unmanned aircraft within an airspace 96.

Figure 5:
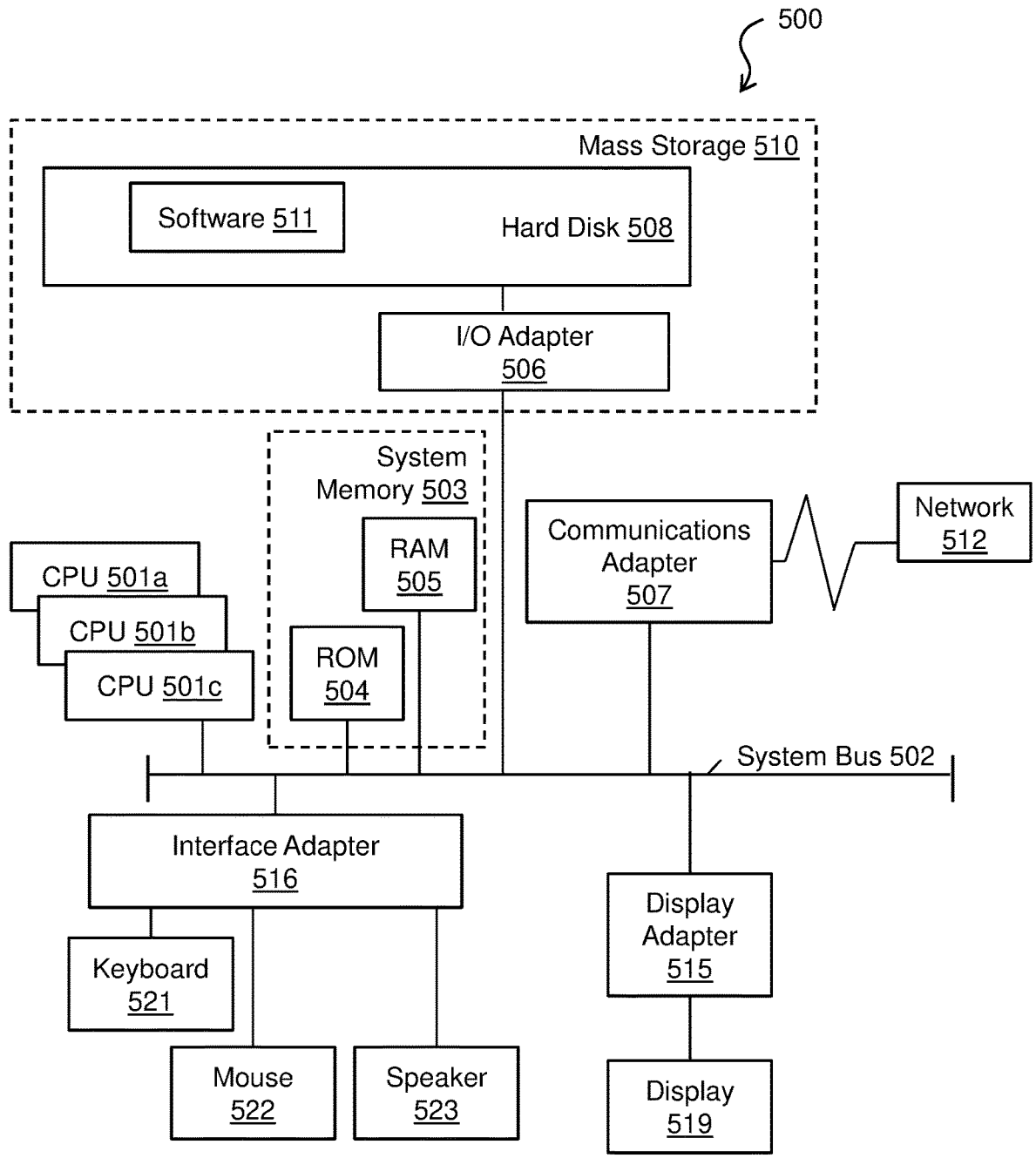
FIG. 5 depicts a block diagram of a computer system for use in implementing one or more embodiments of the invention The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Thus, it can be seen from the foregoing that embodiments of the invention provide technical effects and benefits. In accordance with aspects of the invention, the technical effects and benefits include systems for managing unmanned vehicles and aircraft in a defined airspace or area. Reinforcement learning is deployed to optimize the state of the system which includes travel lanes and UAs operating within the travel lanes. As UAs are being routed through the airspace, the reinforcement learning allows for exploratory and/or greedy tasks to be enacted to further optimize. Based on changes to the state of the system, rewards are calculated such that the reinforcement learning model can build upon prior system states and changes based on actions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a set of unmanned aircraft (UAs), the computer-implemented method comprising:
   receiving, by a processor, airspace data associated with a predefined airspace;
   obtaining roadway data associated with the predefined airspace;
   determining a set of vertically aligned air travel channels within the predefined airspace based on the roadway data;
   defining a set of travel lanes within the set of vertically aligned air travel channels and a set of exchange locations for the set of travel lanes in the predefined airspace corresponding to intersection locations in the roadway data, wherein each travel lane in the set of travel lanes comprises an altitude range and a higher altitude travel lane has fewer exchange locations than a lower altitude travel lane;
   receiving UA data associated with the set of UAs within the predefined airspace, wherein the UA data comprises one or more flight paths for each UA in the set of UAs; and
   assigning each UA in the set of UAs to a travel lane in the set of travel lanes based on the one or more flight paths, wherein the computer-implemented method further comprises:
   determining, by a machine learning model, a current state of the set of UAs in the predefined airspace, determining a first action to be enacted for at least one UA in the set of UAs in the predefined airspace based on the current state and enacting the first action; and
   operating each UA in the set of UAs to travel along the travel lane to which each UA in the set of UAs is assigned.

2. The computer-implemented method of claim 1 further comprising:
   evaluating a state of the set of UAs in the predefined airspace;
   determining a reward for the machine learning model based at least in part on the state after the first action has been enacted; and
   updating the machine learning model based on the reward.

3. The computer-implemented method of claim 1, wherein:
   the set of travel lanes comprises a first travel lane and a second travel lane; and
   the set of UAs comprises a first UA and a second UA.

4. The computer-implemented method of claim 3, wherein the first travel lane is at a greater altitude than the second travel lane.

5. The computer-implemented method of claim 3, wherein a first speed limit in the first travel lane is greater than a second speed limit in the second travel lane.

6. The computer-implemented method of claim 3, wherein the set of UAs can exit the defined airspace from the second travel lane.

7. The computer-implemented method of claim 3 further comprising:
   determining a first destination for a first UA in the set of UAs;
   monitoring a current location of the first UA in the predefined airspace; and
   assigning the first UA to the second travel lane based on a determination that the first destination for the first UA being within a threshold distance from the current location of the first UA.

8. The computer implemented method of claim 7, wherein the first UA transitions from the first travel lane to the second travel lane at an exchange location in the set of exchange locations.

9. The computer-implemented method of claim 2, wherein the machine learning model comprises a reinforcement learning model.

10. A system comprising:
    a memory having computer readable instructions; and
    one or more processors for executing the computer readable instructions, the computer readable instructions controlling the one or more processors to perform operations for operating a set of unmanned aircraft (UAs) comprising:

receiving airspace data associated with a predefined airspace;

obtaining roadway data associated with the predefined airspace;

determining a set of vertically aligned air travel channels within the predefined airspace based on the roadway data;

defining a set of travel lanes within the set of vertically aligned air travel channels and a set of exchange locations for the set of travel lanes in the predefined airspace corresponding to intersection locations in the roadway data, wherein each travel lane in the set of travel lanes comprises an altitude range and a higher altitude travel lane has fewer exchange locations than a lower altitude travel lane;

receiving UA data associated with a set of UAs within the predefined airspace, wherein the UA data comprises one or more flight paths for each UA in the set of UAs; and assigning each UA in the set of UAs to a travel lane in the set of travel lanes based on the one or more flight paths, wherein the operations further comprise:

determining, by a machine learning model, a current state of the set of UAs in the predefined airspace, determining a first action to be enacted for at least one UA in the set of UAs in the predefined airspace based on the current state and enacting the first action; and operating each UA in the set of UAs to travel along the travel lane to which each UA in the set of UAs is assigned.

11. The system of claim 10 further comprising:

evaluating a state of the set of UAs in the predefined airspace;

determining a reward for the machine learning model based at least in part on the state after the first action has been enacted; and updating the machine learning model based on the reward.

12. The system of claim 10, wherein:

the set of travel lanes comprises a first travel lane and a second travel lane; and the set of UAs comprise a first UA and a second UA.

13. The system of claim 12, wherein the first travel lane is at a greater altitude than the second travel lane.

14. The system of claim 12, wherein a first speed limit in the first travel lane is greater than a second speed limit in the second travel lane.

15. A computer program product comprising a computer readable storage medium having program instructions embodied therewith, the program instructions executable by a processor to cause the processor to perform operations for operating a set of unmanned aircraft (UAs) comprising:

receiving airspace data associated with a predefined airspace;

obtaining roadway data associated with the predefined airspace;

determining a set of vertically aligned air travel channels within the predefined airspace based on the roadway data;

defining a set of travel lanes within the set of vertically aligned air travel channels and a set of exchange locations for the set of travel lanes in the predefined airspace corresponding to intersection locations in the roadway data, wherein each travel lane in the set of travel lanes comprises an altitude range and a higher altitude travel lane has fewer exchange locations than a lower altitude travel lane;

receiving UA data associated with a set of UAs within the predefined airspace, wherein the UA data comprises one or more flight paths for each UA in the set of UAs; and assigning each UA in the set of UAs to a travel lane in the set of travel lanes based on the one or more flight paths, wherein the operations further comprise:

determining, by a machine learning model, a current state of the set of UAs in the predefined airspace, determining a first action to be enacted for at least one UA in the set of UAs in the predefined airspace based on the current state and enacting the first action; and operating each UA in the set of UAs to travel along the travel lane to which each UA in the set of UAs is assigned.

16. The computer program product of claim 15 further comprising:

evaluating a state of the set of UAs in the predefined airspace;

determining a reward for the machine learning model based at least in part on the state after the first action has been enacted; and updating the machine learning model based on the reward.

17. The computer program product of claim 15, wherein:

the set of travel lanes comprises a first travel lane and a second travel lane; and the set of UAs comprise a first UA and a second UA.

18. The computer program product of claim 17, wherein the first travel lane is at a greater altitude than the second travel lane.

19. The computer program product of claim 17, wherein a first speed limit in the first travel lane is greater than a second speed limit in the second travel lane.

* * * * *